US009219850B2

(12) United States Patent
Alm et al.

(10) Patent No.: US 9,219,850 B2
(45) Date of Patent: Dec. 22, 2015

(54) MONITORING CAMERA

(71) Applicant: AXIS AB, Lund (SE)

(72) Inventors: Carl-Axel Alm, Lund (SE); Viktor Gustafsson, Lund (SE); Stefan Lundberg, Lund (SE); Mikael Persson, Malmo (SE)

(73) Assignee: AXIS AB, Lund (SE)

( * ) Notice: Subject to any disclaimer, the term of this patent is extended or adjusted under 35 U.S.C. 154(b) by 136 days.

(21) Appl. No.: 13/780,386

(22) Filed: Feb. 28, 2013

(65) Prior Publication Data
US 2013/0222683 A1    Aug. 29, 2013

Related U.S. Application Data

(60) Provisional application No. 61/607,814, filed on Mar. 7, 2012.

(30) Foreign Application Priority Data

Feb. 29, 2012  (EP) .................................... 12157528

(51) Int. Cl.
H04N 5/225       (2006.01)
(52) U.S. Cl.
CPC ........... *H04N 5/2253* (2013.01); *H04N 5/2252* (2013.01)

(58) Field of Classification Search
CPC ............ H04N 5/2252; H04N 5/23241; H04N 5/2251; G03G 15/5004; G03G 15/80; G03G 15/2039; G01T 1/244
USPC .................. 348/207.11, 211.4, 244, 372, 373
See application file for complete search history.

(56) References Cited

U.S. PATENT DOCUMENTS

| | | |
|---|---|---|
| 2008/0316344 A1 | 12/2008 | Yamamiya |
| 2010/0134604 A1* | 6/2010 | Kieffer et al. .................. 348/61 |
| 2010/0275592 A1 | 11/2010 | Topliss et al. |
| 2013/0186596 A1* | 7/2013 | Rubenstein et al. ..... 165/104.17 |
| 2013/0293711 A1* | 11/2013 | Kapuria et al. ............... 348/143 |

* cited by examiner

*Primary Examiner* — Twyler Haskins
*Assistant Examiner* — Padma Haliyur
(74) *Attorney, Agent, or Firm* — Volpe and Koenig, P.C.

(57) ABSTRACT

A monitoring camera includes a camera lens, an image sensor, and a housing enclosing the image sensor. The housing encloses a volume of Phase Changing Material (PCM) having the characteristic of not beginning a phase change until its temperature rises above a predetermined phase changing temperature. The phase changing temperature is in the range of 20-80 degrees Celsius, and the PCM is arranged to enclose the camera lens.

14 Claims, 5 Drawing Sheets

MONITORING CAMERA

FIELD OF INVENTION

The present invention relates to monitoring cameras and in particular to temperature regulation of monitoring cameras.

BACKGROUND

Cameras and in particular the image sensor of a camera is very sensitive to heat. The image quality delivered from an image sensor degrades significantly at rising temperature. Additionally, the electronics of a camera including an image sensor is also sensitive to heat. Performance of electronics are compromised by the heat, it is even possible that the heat permanently damages the electronics.

The electronics and the image sensors in modern cameras are therefore often thermally coupled to heat sinks. Heat sinks are passive components which dissipates the heat into the surrounding air. These cooling systems are traditionally equipped with mechanical fans directing airflow across the heat sink for increased cooling effect. However, when the temperature of the surrounding air increases these systems have more and more trouble in transporting heat away from the camera components and the camera.

SUMMARY

A method and monitoring camera provide improved operation temperatures for components of a camera. A monitoring camera comprises a camera lens, an image sensor, and a housing enclosing the image sensor. The housing further encloses a volume of Phase Changing Material, PCM, having the characteristic of not to begin phase changing until its temperature rises above a predetermined phase changing temperature, wherein the phase changing temperature is in the range of 20-80 degrees Celsius. An advantage of arranging PCM like this is that chances of reliable operation of the camera is increased. Moreover, by selecting the phase changing temperature in the above range, depending on the application, the PCM may be able to cycle through the phases of the PCM efficiently and thereby may the thermic inertia of the system be increased.

According to one embodiment, the phase changing temperature Tp of the PCM is in the range of 40-50 degrees Celsius. This temperature range may be effective in warmer climates and still allowing for the PCM to cycle through the phases of the PCM.

In another embodiment, the volume of PCM is thermally coupled to the image sensor. The advantage being that the temperature of the image sensor is more likely to be kept low enough in order not to degrade image quality of produced images.

In yet another embodiment, the PCM is thermally coupled to a processing device included in the camera. One advantage of this is that the heat is quickly transported away from other components in the camera. The risk of the quality of the operation of the camera being degraded is decreased.

In one embodiment, the camera includes PCM cooling means arranged to increase exposure of the PCM volume to the ambient temperature when ambient temperature is below the phase changing temperature of the PCM.

In another embodiment, the monitoring camera further comprises a temperature sensor configured to measure the temperature of the PCM.

In yet another embodiment, the monitoring camera further comprises a regulator configured to control the power consumption of the camera based on the temperature measured by means of the temperature sensor.

According to one embodiment, the housing is an outer housing, wherein the camera further comprises an inner housing enclosing the image sensor, and wherein the PCM is arranged between the inner housing and the outer housing.

According to another embodiment the outer housing includes a sun-shield.

In one embodiment, the camera is attached to a structure by means of a mount and wherein the mount is configured to thermally insulate the camera from the structure.

In a further embodiment, the PCM is arranged to enclose the camera lens.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE PREFERRED EMBODIMENTS

Monitoring cameras are positioned at many different locations in order to monitoring events at the location. Some of these locations may be in a warmer climate or in a warm environment, e.g., in a dessert, in a cityscape in a warm climate, in a hot processing or industrial environment. The problem in such environments is that the surrounding air may get so warm that the passive cooling systems mentioned above are not effective anymore which results in that the equipment do not work as intended or even worse that the equipment is destroyed.

The described embodiments are based on the idea of trying to make the camera less prone to change its temperature due to temperature variations of the air surrounding the camera or temperature emissions from electronics of the camera itself. Instead of trying to cool the camera, the camera is configured to change temperature slowly or not at all, i.e., the camera is configured to have large thermal inertia. According to the described embodiments, this is achieved by providing Phase Changing Material (PCM) to the camera.

Figure 1:
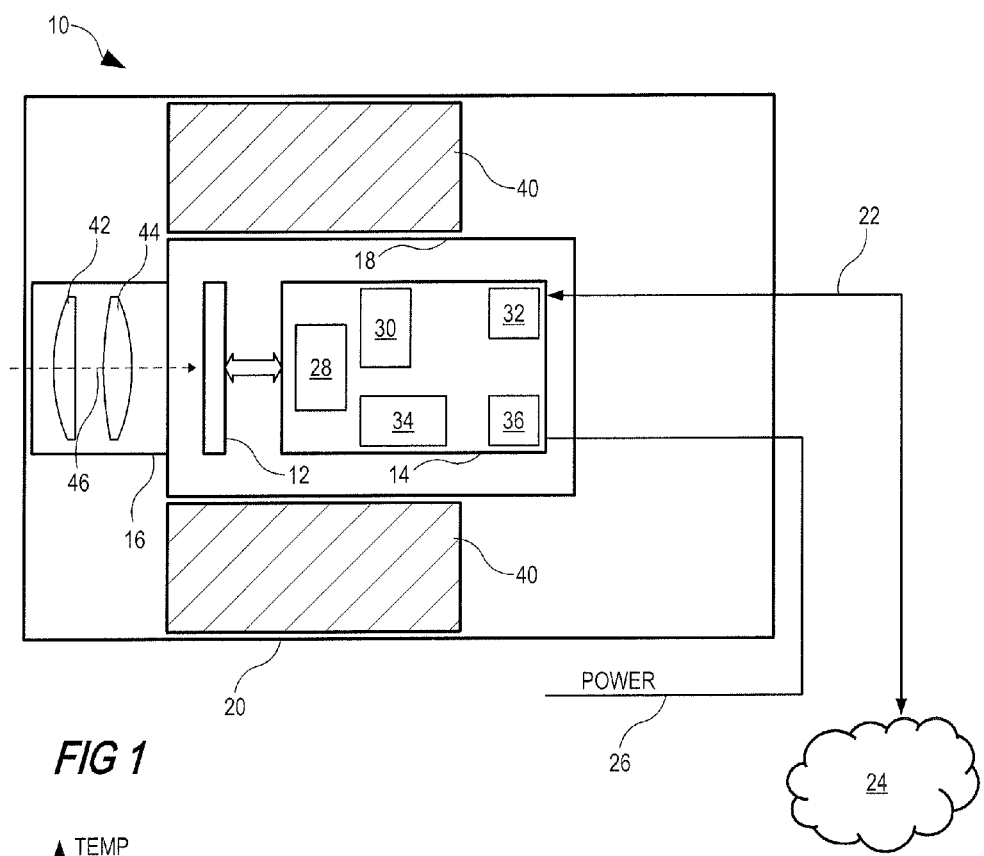
FIG. 1 is a schematic view of a camera according to one embodiment of the invention.

Now referring to FIG. 1, a monitoring camera 10 according to one embodiment of the invention includes an image sensor 12, electronics 14, and a camera lens 16. The camera further includes an inner housing 18 enclosing the image sensor 12 and the electronics 14 and an outer housing 20 enclosing the inner housing 18. The camera lens 16 may be arranged protruding from the inner housing 18 and be enclosed by the outer housing as depicted in FIG. 1. However, the camera lens 16 may likewise be substantially enclosed by the inner housing 18 or even protruding from the outer housing 20, not shown. The camera 10 may be provided with wired computer network communication technology and may therefore have a computer network line 22 connected from the electronics 14 to a computer network 24. Moreover, the camera 10 may be powered via a separate power cord 26, via a battery (not shown) or using power over the network connection (not shown), e.g., Power Over Ethernet. The electronics of the camera 10 may for instance include image processing unit 28 for processing images, a general processing unit 30 for other camera functionality, network circuitry 32, memory 34, and power electronics 36 for powering of the camera 10. Further, the camera 10 includes PCM 40. The PCM 40 in this embodiment is arranged on the outside of the inner housing 18 but inside the outer housing 20.

The camera lens 16 is an optical device arranged to form an image by focusing light from the image view onto, in this particular case, the image sensor 12. The camera lens 16 is an optical system including at least two lens elements 42, 44, arranged in a common optical path 46. The lens elements 42, 44, of the camera lens 16 is formed and combined in order to generate an adequate image projection for the application in which the camera is to be used. These types of camera lenses are often required in order to achieve high optical quality.

Figure 2:
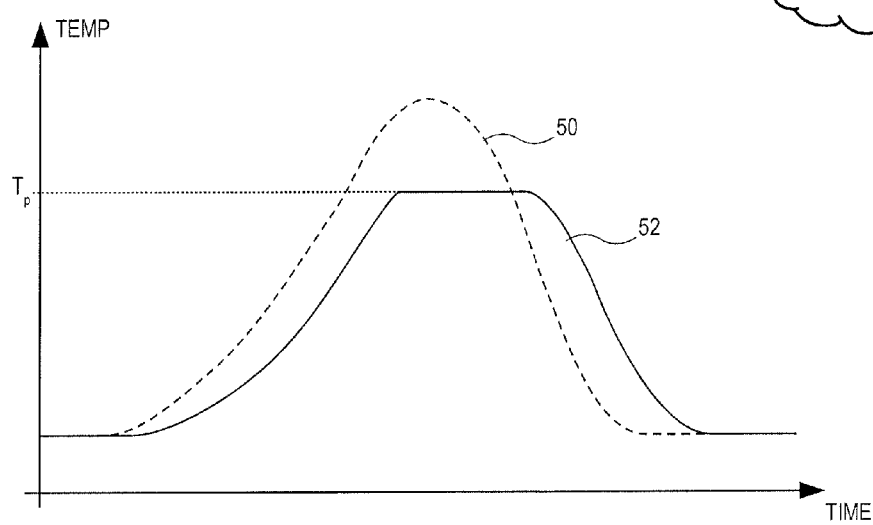
FIG. 2 is a diagram depicting the temperature in an enclosure being exposed for the same variation in temperature over time, one graph representing the temperature in an enclosure including PCM and one graph representing the temperature in an enclosure not including PCM.

The PCM 40 is a material that changes isothermally in physical state when heated. For example, the material may change from a first state to a second state, e.g., from a solid to a liquid, from a liquid to a gas, from one solid state to another solid state, etc. When heat is removed from the material, when in the second state, the material reverts from the second state back to the first state, e.g., from liquid to solid. The effect in temperature in an enclosure when introducing PCM 40 is illustrated by the graph in FIG. 2. The dashed line 50 represents the variation of the temperature over time in an enclosure not having any PCM and the solid line 52 represents the temperature in the same enclosure being exposed for the same temperature variation over time as resulted in the dashed graph 50. The effect of the PCM is thus to act as a temperature buffer, hindering the temperature from exceeding a predetermined value. The PCM operates by consuming the heat energy to change the phase of the material without raising the temperature and then to release the heat energy by reverting to the previous state when the surrounding temperature is dropping below a threshold. The amount of heat energy that the PCM may absorb depends on the material and on the volume of the material.

In one embodiment, the PCM is selected to have a phase changing temperature in the range of 20-80 degrees Celsius. One reason for selecting PCM having phase changing temperature in this range is to enable the PCM to revert from the second phase back to the first phase during periods of cooler temperature. A factor for consideration when selecting the temperature range is the mean temperature over longer time periods at the location of the camera. In order to enable the PCM to revert the mean temperature should be lower than the phase changing temperature of the PCM. One temperature range that is particularly interesting for cameras located in warmer climates, such as hot cityscapes, deserts, warm locales in an industry facility, etc., is the range from 40-50 degrees Celsius. In one embodiment, the phase changing temperature for the PCM is selected based on the discovery that our camera, using components of today, operates and provides acceptable quality at temperatures below 60 degrees Celsius. Another reason for selecting a phase changing temperature of 40-50 degrees Celsius is that the average temperature over a day and night rarely, if ever, is higher than 50 degrees Celsius, even when the additional heat from the camera is accounted for, and thereby there is a good chance of having all PCM revert to its initial state during a period of lower temperature, e.g., the night. Examples of PCM that may be used are fatty acids or salt hydrates.

Figure 3:
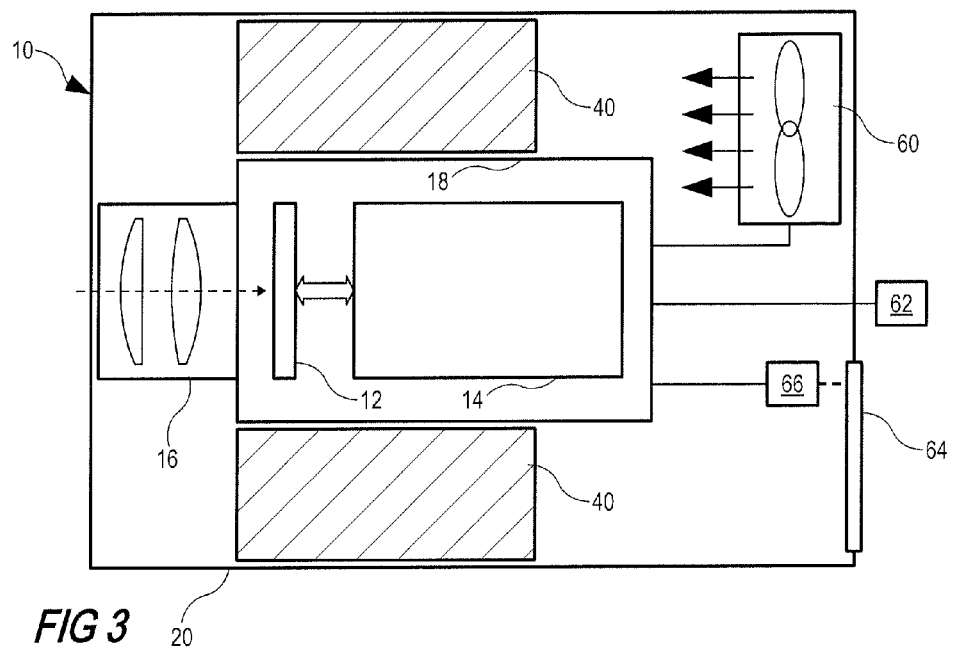
FIG. 3 is a schematic view of a camera including means for making the PCM revert more efficient according to one embodiment of the invention.

According to another embodiment, the camera further includes means 62 for measuring the temperature of the surrounding air and means 60, 64, for increasing the exposure of the PCM 40 to the surrounding air when the temperature of the surrounding air is below a specific threshold value. By arranging such means, the PCM 40 may be reverted to its initial state faster, with less temperature difference, or more efficient. This type of embodiment may be implemented by including a fan 60 in the camera 10 and a temperature sensor 62 for measuring the temperature of the surrounding air, see FIG. 3, and arrange the fan to make the air pass over surfaces of the PCM 40. The fan 60 is then started when the temperature of the surrounding air is below the predetermined temperature threshold value Tp. Alternatively, the housing 20 may include an ventilation means 64, including an opening in the housing for the passing of air between the inside and the outside of the housing 20 and an actuator 66 controlled by the processing means 30 of the camera in order to open and close the ventilation means 64. According to another alternative, the housing 20 includes a heat exchanger module (not shown) arranged in the wall of the housing 20 and controlled by the processing means 30 of the camera in order to activate and deactivate heat exchange between inside and outside of the housing 20. One advantage of using a heat exchanger instead of openings in the outer housing 20 is that the risk of having objects such as sand, water, insects, animals, etc. enter the housing 20 is decreased. Other alternative embodiments may include any combination of the above embodiments.

Figure 4:
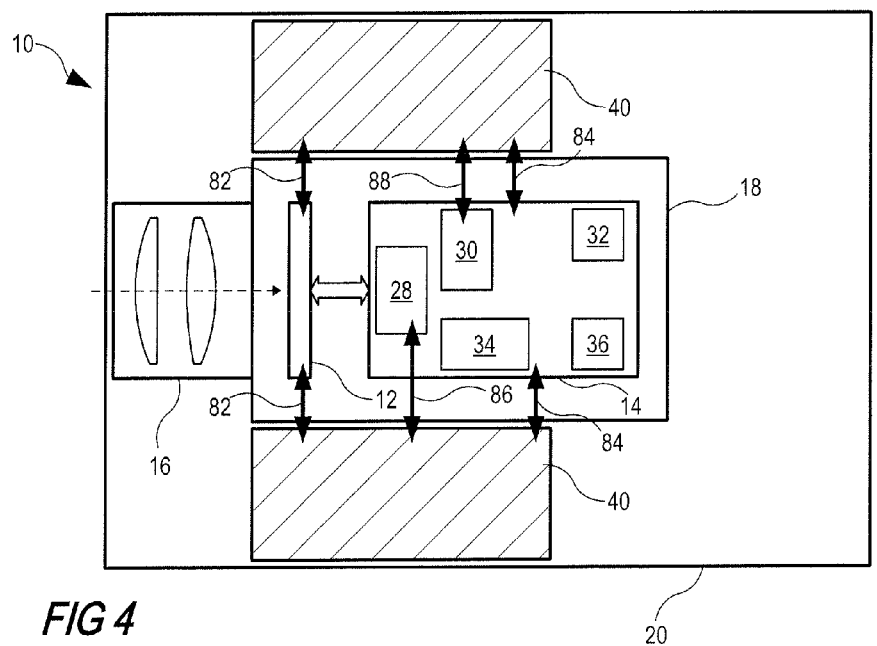
FIG. 4 is a schematic view of the camera in FIG. 1 including thermal conductors connecting circuitry of the camera to the PCM in accordance with one embodiment of the invention.

According to another embodiment of the invention, see FIG. 4, the PCM 40 is thermally connected by means of a thermal conductor 82 to the image sensor 12, a thermal conductor 84 to the electronics 14, e.g., to an electronic circuit board including electronic components, a dedicated thermal conductor 86 to the image processing unit 28, and a dedicated thermal conductor 88 to the general processing unit 30. These thermal conductors 82-88 make the heat transport from these devices to the PCM 40 more efficient and may therefore improve performance and/or life span of devices and/or components. All thermal connectors 82-88 may be installed in a camera 10, as depicted in FIG. 4. Alternatively, in some applications a single heat conductor, selected from the group of heat conductors 82-88 in FIG. 4, may be implemented and in other applications any combination of the heat conductors 82-88 may be implemented. The image quality from the image sensor 12 depends largely on the temperature of the image sensor 12, e.g., the noise in the sensor increases with increased temperature. Hence, applications in which the image quality is of particular importance may include the heat conductor 82 connecting the image sensor 12 to the PCM 40.

Figure 5:
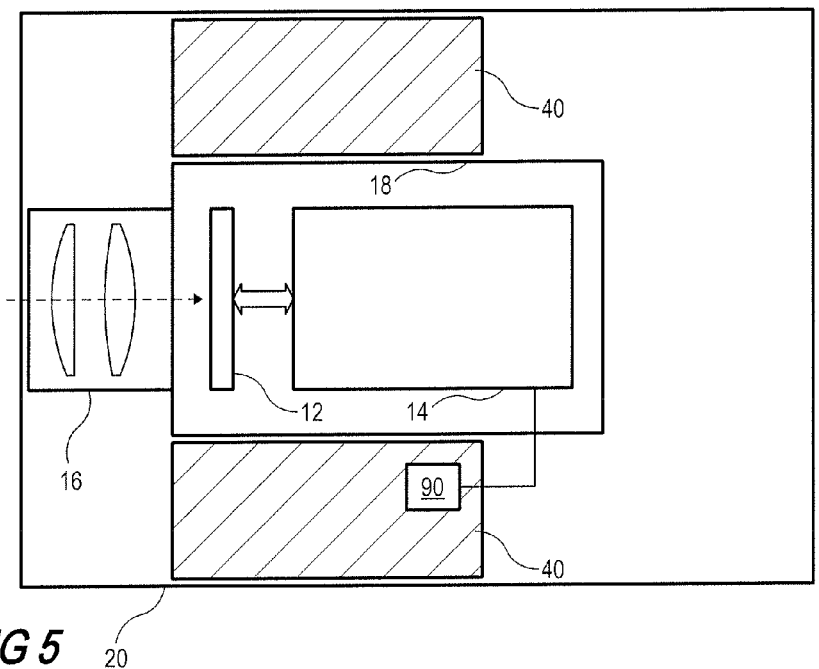
FIG. 5 is a schematic view of a camera including a temperature sensor sensing the temperature of the PCM according to another embodiment of the invention.

The heat generated by the camera components depends partly on the performance of the components. This observation is utilized in one embodiment including a temperature sensor 90 arranged to measure the temperature of the PCM 40, see FIG. 5. The camera 10 according to this embodiment further includes means, e.g., the general processing unit 30 and proper program code, being configured to adjust the processing frequency of the general processing unit 30 based on the measured temperature, being configured to adjust the image frequency to be delivered, or being configured to adjust any other parameter known to the skilled person as having this effect.

Figure 6:
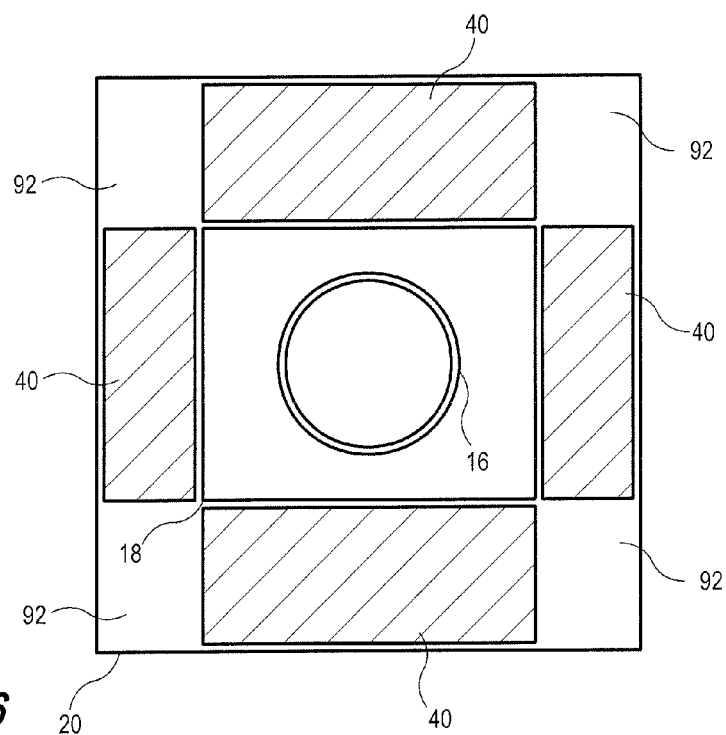
FIG. 6 is a schematic front view of distribution of PCM in a camera according to one embodiment of the invention.

In FIG. 6, the inside of the housing 20 according to one embodiment is shown from a view showing the camera lens 16, i.e., front view. According to this embodiment, the PCM 40 is arranged on all sides of the inner housing 18. The PCM 40 may be also arranged on all sides of the inner housing 18 in the embodiments described in connection with the cameras of FIGS. 1, 3, 4, and 5. The PCM may be arranged to also fill the empty volumes 92 in order to provide more PCM 40.

According to one embodiment, the outer housing 20 acts as a sun-shield that includes a view port through which the camera lens 16 of the camera 10 captures images. The view port may be an opening in the outer housing 20 or it may be an opening in the outer housing 20 in which a transparent material has been arranged. Further, this outer housing 20 may have a shade protruding out over the view port and the outer surface of the outer housing 20 may be covered by a material providing a reflecting surface for reflecting sunlight, e.g., paint, foil, sheets, etc.

The camera 10 may be mounted to a structure by means of a mount when in use. According to one embodiment, the mount is configured to thermally insulate the camera 10 from the structure it is mounted on. This may be achieved by means of arranging thermally insulating material onto the portion attached to the camera 10 and on this portion onto a surface facing the camera. If the camera mount includes a ball joint, the ball joint may be thermally insulated. Moreover, the entire mount may be fabricated from a thermally insulating material. The advantage of implementing any of these embodiments is that heat from the structure that the camera 10 is mounted on is not conducted over to the camera 10.

Figure 7:
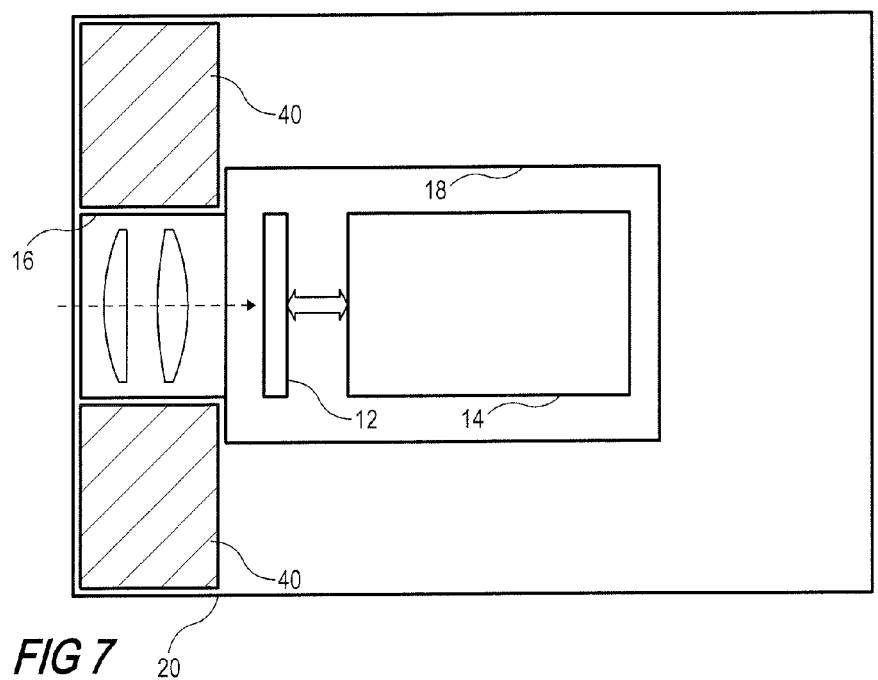
FIG. 7 is a schematic view of another distribution of PCM in a camera according to one embodiment of the invention.
Figure 8:
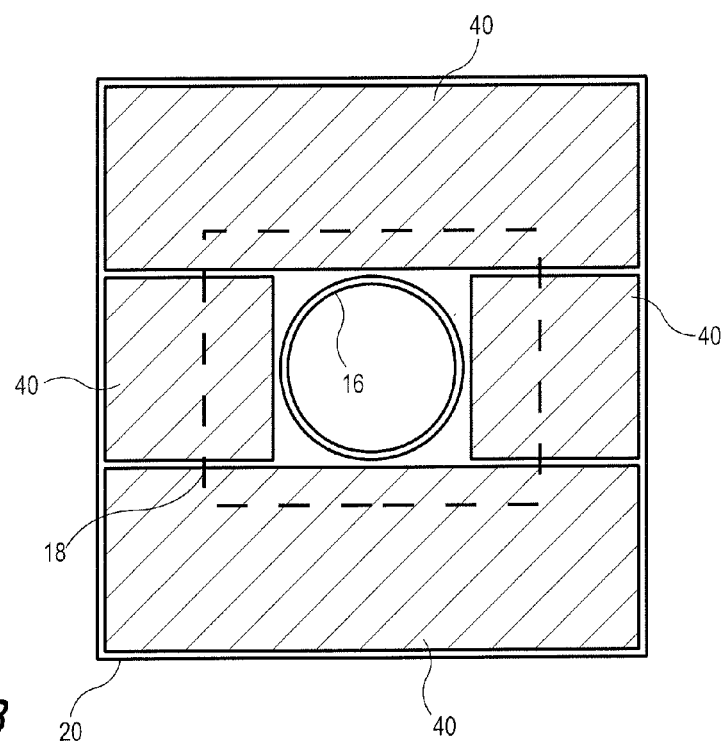
FIG. 8 is a schematic front view of the distribution of PCM shown in FIG. 7.

Moreover, the PCM 40 may be arranged in other ways than illustrated in the figures previously discussed. For instance, PCM 40 may be arranged enclosing the camera lens 16 in order to decrease the risk of problematic temperature fluctuations in the camera lens 16 which may result in deteriorating quality of the camera lens 16 due to thermal stress and other temperature related problems, see FIGS. 7 and 8. This embodiment may be combined with any of the other embodiments. By arranging the PCM 40 close to the camera lens 16, the stability of the temperature of the camera lens 16 may be ensured. An additional advantage of this embodiment is that the PCM 40 also is able to have an efficient cooling effect on a focus motor and/or a zoom motor arranged in the camera lens 16.

Another alternative is to arrange the PCM 40 directly at the electronics 14 and image sensor 12, e.g., by not providing any inner housing 18. A further alternative is to shape the PCM 40 into a structural device formed to receive at least part of the inner housing 18. In such implementation the PCM structure and the camera 10 may be forming two separate modules in a modular camera system.

According to one embodiment the camera 10 is a camera 10 detecting visible light and generating digital images based on the detection. However, according to an alternative embodiment the camera is a thermo camera, e.g., a camera detecting infrared light in order to present an image of temperature differences in the image view.

Figure 9:
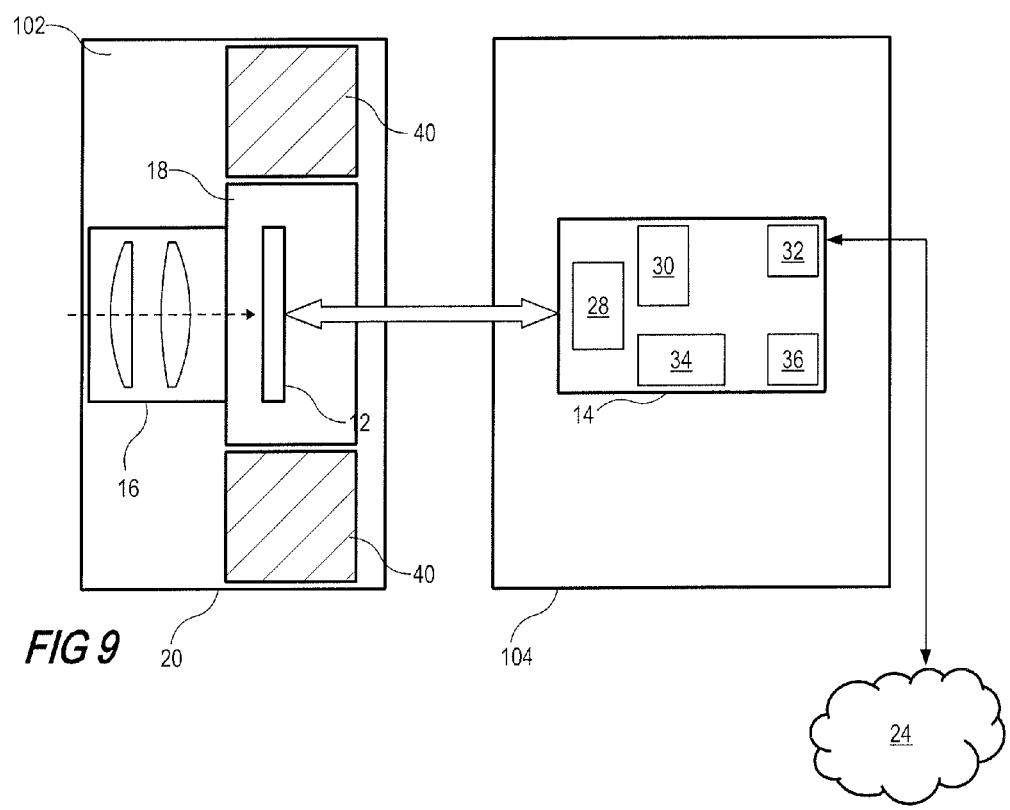
FIG. 9 is a schematic view of a camera according to another embodiment of the invention in which the image capturing means is physically separated from more processing and power intensive means.

In another embodiment, see FIG. 9, an image capturing portion 102 includes electronics such as the image sensor 12 and electronics for transfer of the output from the image sensor 12 to a separate device 104. The separate device 104 then may include image processing unit 28 for processing images, a general processing unit 30 for other camera functionality, network circuitry 32, memory 34, and power electronics 36. This separate device 104 may be positioned at a distance from the image capturing portion 102 including the camera lens 16 and the image sensor 12.

The invention claimed is:

1. A monitoring camera, comprising:
   a camera lens;
   an image sensor; and
   a housing enclosing the image sensor, the housing further enclosing a volume of Phase Changing Material (PCM) having the characteristic of not beginning a phase change until its temperature rises above a predetermined phase changing temperature, wherein the PCM is arranged to surround the image sensor;
   wherein the phase changing temperature is in the range of 20-80 degrees Celsius, and the PCM is arranged to enclose the camera lens; and
   wherein the camera includes PCM cooling means arranged to increase exposure of the PCM volume to the ambient temperature which is started when ambient temperature is below the phase changing temperature of the PCM.

2. The monitoring camera according to claim 1, wherein the phase changing temperature is in the range of 40-50 degrees Celsius.

3. The monitoring camera according to claim 1, wherein the volume of PCM is thermally coupled to the image sensor.

4. The monitoring camera according to claim 1, wherein the PCM is thermally coupled to a processing device included in the camera.

5. The monitoring camera according to claim 1, further comprising a temperature sensor configured to measure the temperature of the PCM.

6. The monitoring camera according to claim 5, further comprising a regulator configured to control the power consumption of the camera based on the temperature measured by means of the temperature sensor.

7. The monitoring camera according to claim 1, wherein the housing includes a sun-shield.

8. The monitoring camera according to claim 1, wherein the housing is an outer housing, wherein the camera further comprises an inner housing enclosing the image sensor, and wherein the PCM is arranged to fill a volume between the inner housing and the outer housing.

9. The monitoring camera according to claim 1, wherein the camera is attached to a structure by a mount and wherein the mount is configured to thermally insulate the camera from the structure.

10. A monitoring camera, comprising:
   a camera lens;
   an image sensor;
   a housing enclosing the image sensor, the housing further enclosing a volume of Phase Changing Material (PCM) having the characteristic of not beginning a phase change until its temperature rises above a predetermined phase changing temperature, wherein the PCM is arranged on all sides of the housing; and
   wherein the camera includes PCM cooling means arranged to increase exposure of the PCM volume to the ambient temperature which is started when ambient temperature is below the phase changing temperature of the PCM.

11. The monitoring camera according to claim 10, wherein the PCM material substantially toroidally surrounds the camera lens.

12. The monitoring camera according to claim 10, wherein the housing includes an outer housing and an inner housing enclosing the image sensor, wherein the PCM material fills a volume between the outer housing and the inner housing.

13. The monitoring camera according to claim 1, further comprising:
   a thermal conductor configured to couple the image sensor to the PCM.

14. The monitoring camera according to claim 10, further comprising:
   a thermal conductor configured to couple the image sensor to the PCM.

* * * * *